(12) United States Patent
Morimoto et al.

(10) Patent No.: US 8,107,498 B2
(45) Date of Patent: Jan. 31, 2012

(54) NETWORK RELAY APPARATUS, DATA RECEIVING APPARATUS, DATA TRANSMITTING APPARATUS, MULTIPATH MTU FINDING METHOD AND MULTIPATH MTU FINDING SYSTEM

(75) Inventors: Tetsuro Morimoto, Kanagawa (JP); Takashi Aramaki, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 12/294,014

(22) PCT Filed: Mar. 28, 2007

(86) PCT No.: PCT/JP2007/056701
§ 371 (c)(1),
(2), (4) Date: Sep. 22, 2008

(87) PCT Pub. No.: WO2007/114183
PCT Pub. Date: Oct. 11, 2007

(65) Prior Publication Data
US 2009/0225758 A1  Sep. 10, 2009

(30) Foreign Application Priority Data
Mar. 31, 2006  (JP) ................................ 2006-101139

(51) Int. Cl.
*H04J 3/08* (2006.01)
(52) U.S. Cl. ...................................... 370/501
(58) Field of Classification Search .................. None
See application file for complete search history.

(56) References Cited

U.S. PATENT DOCUMENTS

| | | | |
|---|---|---|---|
| 2001/0055317 A1* | 12/2001 | Kajizaki et al. | 370/474 |
| 2003/0076850 A1* | 4/2003 | Jason, Jr. | 370/414 |
| 2003/0185208 A1 | 10/2003 | Lee | |
| 2004/0008664 A1* | 1/2004 | Takahashi et al. | 370/351 |
| 2004/0218550 A1 | 11/2004 | Kim | |
| 2005/0041635 A1* | 2/2005 | Chung et al. | 370/351 |
| 2005/0111437 A1 | 5/2005 | Maturi | |
| 2005/0157727 A1* | 7/2005 | Date et al. | 370/395.21 |

FOREIGN PATENT DOCUMENTS

| | | |
|---|---|---|
| JP | 2002-009832 | 1/2002 |
| JP | 2004-048178 | 2/2004 |

(Continued)

OTHER PUBLICATIONS

Supplemental European Search Report dated Mar. 9, 2010.

(Continued)

*Primary Examiner* — Yong Zhou
(74) *Attorney, Agent, or Firm* — Dickinson Wright PLLC

(57) ABSTRACT

Disclosed is a technique in which, when a plurality of packet routing paths exist, a sender of the packet selects an optimum packet length so as to use network resources effectively. According to the technique, when a plurality of routing paths like a network A (104) and a network B (105) exist for a packet transmitted from a data transmitting apparatus (103) to a data receiving apparatus (102) via a network relay apparatus (101), the network relay apparatus or the data receiving apparatus searches path MTU information of each path, and notifies the data transmitting apparatus of multipath MTU information including each search result. The data transmitting apparatus refers to this multipath MTU information to compare the plurality of paths about their path MTU information to decide a packet length suitable for the packet transmitted to the data receiving apparatus.

9 Claims, 11 Drawing Sheets

FOREIGN PATENT DOCUMENTS

| | | |
|---|---|---|
| JP | 2004-048181 | 2/2004 |
| JP | 2004-336716 | 11/2004 |
| JP | 2005-057734 | 3/2005 |

OTHER PUBLICATIONS

Mathis, M. et al., "Path MTU Discovery," Network Working Group, Internet-Draft, Mar. 3, 2006, pp. 1-31.

International Search Report dated Apr. 24, 2007.

J. Mogul, et al, Network Working Group, Request for Comments: 1191, Obsoletes: RFC 1063, "Path MTU Discovery," Nov. 1990, pp. 1-19, p. 5. line 11.

J. McCann, et al., "Path MTU Discovery for IPv6," Network Working Group, Request for Comments: 1981, Category: Standards Track, Aug. 1996, pp. 1-15, p. 5. line 13.

D. Johnson, et al., "Mobility Support in IPv6," Network Working Group, Request for Comments: 3775, Category: Standards Track, Jun. 2004, pp. 1-165, p. 5. line 15.

* cited by examiner

FIG. 11

| NEXT HEADER | HDR EXT LENGTH | OPTION TYPE | OPT DATA LENGTH |
|---|---|---|---|
| PATH INFORMATION SIZE | | PATH NUMBER | |
| FLAG | MTU_A | | |
| FLAG | MTU_B | | |

| NEXT HEADER | HDR EXT LENGTH | OPTION TYPE | OPT DATA LENGTH |
|---|---|---|---|
| 12 (PATH INFORMATION SIZE) | | 2 (PATH NUMBER) | |
| 0 | MTU_A | | |
| 1 | BAND_A | | |
| 2 | SCHEDULED TIME_A | | |
| 0 | MTU_B | | |
| 1 | BAND_B | | |
| 2 | SCHEDULED TIME_B | | |

| ADDRESS | PATH MTU |
|---------|----------|
| CoA_A | MTU_A |
| CoA_B | MTU_B |
| ⋮ | ⋮ |

| HOME ADDRESS | CARE-OF ADDRESS |
|--------------|-----------------|
| HoA | CoA_A |
| | CoA_B |
| | ⋮ |

FIG. 16

| ADDRESS | PATH MTU |
|---------|----------|
| HoA (1601) | MTU_A (1602) |
|  | MTU_B (1603) |
| ⋮ | ⋮ |

FIG. 17

| ADDRESS | PATH MTU | BAND | SCHEDULED TIME |
|---------|----------|------|----------------|
| CoA_A | MTU_A | BAND_A | SCHEDULED TIME_A |
| CoA_B | MTU_B | BAND_B | SCHEDULED TIME_B |
| ⋮ | ⋮ | ⋮ | ⋮ |

FIG. 18

| ADDRESS | PATH MTU | BAND | SCHEDULED TIME |
|---------|----------|------|----------------|
| HoA | MTU_A | BAND_A | SCHEDULED TIME_A |
|  | MTU_B | BAND_B | SCHEDULED TIME_B |
| ⋮ | ⋮ | ⋮ | ⋮ |

NETWORK RELAY APPARATUS, DATA RECEIVING APPARATUS, DATA TRANSMITTING APPARATUS, MULTIPATH MTU FINDING METHOD AND MULTIPATH MTU FINDING SYSTEM

TECHNICAL FIELD

The present invention relates to a network relay apparatus, a data receiving apparatus, a data transmitting apparatus, a multipath MTU finding method and a multipath MTU finding system, by which packet communication in a packet communication system configured with nodes and links is performed in a multipath state (a state with a plurality of routing paths existing for a packet).

BACKGROUND ART

Path MTU Discovery, Path MTU Discovery for IPv6 and the like are available as conventional path Maximum Transmission Unit (MTU) search techniques (see Non-Patent Document 1 and Non-Patent Document 2 below). In these techniques, a communication apparatus on the transmission side (sender) transmits a packet and confirms whether the packet is delivered successfully to the reception side (destination), where fragmentation of the transmitted packet by a network relay apparatus such as a router is prohibited.

According to these methods, if the packet transmitted from the transmission-side communication apparatus is larger in size than the path MTU, the packet cannot be transferred, and a network relay apparatus failing to the packet transfer transmits an error message to the sender. In other words, unless the transmission-side communication apparatus receives any error message, which means that any error message is not returned, the communication apparatus as the sender finds that the path MTU is larger in size than the transmitted packet length.

One of the merits to examine a path MTU resides in the effective usage of network resources. When a packet larger in size than the path MTU is transmitted, a network relay apparatus on the path divides a packet for fragmentation or an error message is transmitted so as to make the communication apparatus as the sender subdivide the packet and send the same again.

In case the network relay apparatus subdivides a packet on a path, packet fragmentation processing takes place, thus imposing a load on the network. Further, each of the subdivided packet includes a new header added thereto, thus degrading the transmission efficiency of data. When the network relay apparatus transmits an error message to the sender, the sender has to divide a packet with the same contents into small ones and transmit them again.

On the other hand, when a packet relatively smaller in size than the path MTU is transmitted, more packets in number are required to deliver the data with the same amount to a destination. Since each packet includes a header added thereto with a fixed size, a data region in each packet transmitted will be relatively made smaller, thus decreasing the transmission efficiency.

Thus, the transmission with a packet length as close as possible to the path MTU but not exceeding the path MTU can improve the transmission efficiency and can utilize network resources effectively.

As path MTU search methods other than the Path MTU Discovery disclosed in Non-Patent Documents 1 and 2, techniques disclosed in Patent Documents 1 to 3 have been known, for example.

Patent Document 1 discloses a technique in which, when a path MTU changes dynamically, a network side notifies a sender of the changed path MTU. According to the Path MTU Discovery disclosed in Non-Patent Documents 1 and 2, a sender needs to perform path search processing periodically so as to confirm whether a path MTU changes to a large value or not. In the techniques disclosed in Patent Documents 1 to 3, however, it is possible for the network side to notify a communication apparatus as the sender of the path MTU.

In Patent Document 1, when the network relay apparatus notifies the communication apparatus as the sender of the path MTU, Packet Too Big as an Internet Control and Management Protocol (ICMP) message is utilized similarly to the Path MTU Discovery disclosed in Non-Patent Documents 1 and 2. In Patent Document 2, when the network relay apparatus notifies the communication apparatus as the sender of the path MTU, a Binding Update (BU) message specified by mobile Internet Protocol (IP) described in the following Non-Patent Document 3 is utilized. In Patent Document 3, when the network relay apparatus notifies the communication apparatus as the sender of the path MTU, a method of adding an extension header (Destination Option Header) to a normal packet is utilized instead of using the specific messages as in Patent Document 1 and Patent Document 2.

Patent Document 1: Japanese Patent Application Publication No. 2004-48178
Patent Document 2: Japanese Patent Application Publication No. 2004-48181
Patent Document 3: Japanese Patent Application Publication No. 2005-57734 Non-Patent Document 1: Path MTU Discovery (RFC1191, November 1990)
Non-Patent Document 2: Path MTU Discovery for IPv6 (RFC1981, August 1996)
Non-Patent Document 3: Mobility Support in IPv6 (RFC3775, June 2004)

In the above-stated conventional techniques, however, in the case of a multipath state with a plurality of routing paths existing through which a packet can be delivered from a sender to a destination, there is a problem that a different path MTU cannot be used so as to effectively use network resources.

For instance, when the plurality of paths with different path MTUs exist and a network transfers packets using these plurality of paths, if a network communication apparatus as a sender knows a smaller path MTU value only, then smaller packets only will pass through a path with a larger path MTU among the plurality of existing paths from the viewpoint of the network side, which means that the network resources cannot be used effectively.

On the other hand, if the network communication apparatus as a sender knows a larger path MTU value only, then a packet with a larger packet length will pass through, and a packet will not pass through a path with a smaller path MTU so much (or in a path with a small path MTU, a packet subdivided by packet fragmentation processing will pass through), which also means that the network resources cannot be used effectively.

That is to say, according to the conventional path MTU discovery methods, in a multipath state with a plurality of routing paths existing through which a packet can be delivered from a sender to a destination, each path having a different path MTU, the network resources cannot be utilized effectively in spite of the existence of the plurality of paths.

DISCLOSURE OF THE INVENTION

It is an object of the present invention to, in a multipath state, allow a packet sender node to set an appropriate packet length so that the network resources can be utilized effectively, which cannot be dealt with the conventional path MTU discovery methods.

In order to fulfill the above-stated object, a network relay apparatus of the present invention relays a packet in a packet communication system including nodes and links. The network relay apparatus includes:

path MTU search means that, when a plurality of paths exist as a routing path of the packet, searches path MTU information of each of the plurality of paths;

multipath MTU information creation means that creates multipath MTU information including the path MTU information of each of the plurality of paths searched by the path MTU search means; and multipath MTU information notification means that transmits the multipath MTU information to a sender of the packet.

This configuration allows a packet sender node to refer to path MTU information of each of the plurality of paths to set an appropriate packet length selectively, thus enabling effective use of network resources.

Further, in addition to the above configuration, in the network relay apparatus of the present invention, the multipath MTU information includes band information of each of the plurality of paths and/or scheduled time information on availability/non-availability of each of the plurality of paths.

This configuration allows the packet sender node to consider band information in addition to the path MTU information, thus making it possible to control a packet length in accordance with path MTU of a path with large band. Further, this configuration allows the packet sender node to consider scheduled time information in addition to the path MTU information, thus making it possible to properly use the paths in accordance with an available time period for a specific path.

In addition to the above configuration, the network relay apparatus of the present invention further may include a function as a home agent.

In order to fulfill the above-stated object, a data receiving apparatus of the present invention receives a packet in a packet communication system including nodes and links. The data receiving apparatus includes:

path MTU search means that, when a plurality of paths exist as a routing path of the packet, searches path MTU information of each of the plurality of paths;

multipath MTU information creation means that creates multipath MTU information including the path MTU information of each of the plurality of paths searched by the path MTU search means; and multipath MTU information notification means that transmits the multipath MTU information to a sender of the packet.

This configuration allows a packet sender node to refer to path MTU information of each of the plurality of paths to set an appropriate packet length selectively, thus enabling effective use of network resources.

Further, in addition to the above configuration, in the data receiving apparatus of the present invention, the multipath MTU information includes band information of each of the plurality of paths and/or scheduled time information on availability/non-availability of each of the plurality of paths.

This configuration allows the packet sender node to consider band information in addition to the path MTU information, thus making it possible to control a packet length in accordance with path MTU of a path with large band. Further, this configuration allows the packet sender node to consider scheduled time information in addition to the path MTU information, thus making it possible to properly use the paths in accordance with an available time period for a specific path.

In addition to the above configuration, the data receiving apparatus of the present invention further may include a function as a mobile node.

In order to fulfill the above-stated object, a data transmitting apparatus of the present invention transmits a packet in a packet communication system including nodes and links. The data transmitting apparatus includes:

multipath MTU information reception means that, when a plurality of paths exist as a routing path of the packet, receives multipath MTU information including path MTU information of each of the plurality of paths from a network relay apparatus that relays the packet or a data receiving apparatus that receives the packet; and packet length control means that determines a packet length of the packet based on the multipath MTU information received by the multipath MTU information reception means.

This configuration allows a packet sender node to refer to path MTU information of each of the plurality of paths to set an appropriate packet length selectively, thus enabling effective use of network resources.

Further, in addition to the above configuration, in the data transmitting apparatus of the present invention, the multipath MTU information includes band information of each of the plurality of paths and/or scheduled time information on availability/non-availability of each of the plurality of paths.

This configuration allows the packet sender node to consider band information in addition to the path MTU information, thus making it possible to control a packet length in accordance with path MTU of a path with large band. Further, this configuration allows the packet sender node to consider scheduled time information in addition to the path MTU information, thus making it possible to properly use the paths in accordance with an available time period for a specific path.

In addition to the above configuration, the data transmitting apparatus of the present invention further may include a function as a correspondent node.

In order to fulfill the above-stated object, a multipath MTU finding system of the present invention in which, in a packet communication system including nodes and links, a data transmitting apparatus as a sender of a packet acquires path MTU information for determining a packet length of the packet, the packet being relayed by a network relay apparatus and transmitted to a data receiving apparatus, the system including the steps of:

a path MTU search step of, when a plurality of paths exist as a routing path of the packet, searching path MTU information of each of the plurality of paths by the network relay apparatus or the data receiving apparatus;

a multipath MTU information creation step of creating, by the network relay apparatus or the data receiving apparatus, multipath MTU information including the path MTU information of each of the plurality of paths searched by the path MTU search means;

a multipath MTU information notification step of transmitting, by the network relay apparatus or the data receiving apparatus, the multipath MTU information to the sender of the packet;

a multipath MTU information reception step of receiving, by the data transmitting apparatus, when a plurality of paths exist as a routing path of the packet, multipath MTU information including path MTU information of each of the plurality of paths from the network relay apparatus or the data receiving apparatus; and a packet length control step of determining, by the data transmitting apparatus, a packet length of the packet in accordance with the multipath MTU information received by the multipath MTU information reception means.

This configuration allows a packet sender node to refer to path MTU information of each of the plurality of paths to set an appropriate packet length selectively, thus enabling effective use of network resources.

In order to fulfill the above-stated object, a multipath MTU finding system of the present invention is a system in which, in a packet communication system including nodes and links, a data transmitting apparatus as a sender of a packet acquires path MTU information for determining a packet length of the packet, the packet being relayed by a network relay apparatus and transmitted to a data receiving apparatus.

In the system, the data transmitting apparatus includes:

multipath MTU information reception means that, when a plurality of paths exist as a routing path of the packet, receives multipath MTU information including path MTU information of each of the plurality of paths from the network relay apparatus or the data receiving apparatus; and packet length control means that determines a packet length of the packet based on the multipath MTU information received by the multipath MTU information reception means, and the network relay apparatus or the data receiving apparatus includes:

path MTU search means that, when a plurality of paths exist as a routing path of the packet, searches path MTU information of each of the plurality of paths;

multipath MTU information creation means that creates multipath MTU information including the path MTU information of each of the plurality of paths searched by the path MTU search means; and multipath MTU information notification means that transmits the multipath MTU information to the sender of the packet.

This configuration allows a packet sender node to refer to path MTU information of each of the plurality of paths to set an appropriate packet length selectively, thus enabling effective use of network resources.

The present invention has an effect of, in a multipath state, allowing a packet sender node to set an appropriate packet length so that the network resources can be utilized effectively, which cannot be dealt with the conventional path MTU discovery methods.

BRIEF DESCRIPTION OF THE DRAWINGS

FIG. 11 illustrates an exemplary Destination Option Header for delivering the multipath MTU information in the First Embodiment of the present invention.

FIG. 12 illustrates an exemplary Destination Option Header for delivering the multipath MTU information including band information and scheduled time information in the First Embodiment of the present invention.

FIG. 16 illustrates an exemplary multipath MTU information configured with addresses and path MTU information of a plurality of paths in the Second Embodiment of the present invention.

FIG. 17 illustrates an exemplary correspondence relationship among addresses, path MTU information as path information, band information and scheduled time information in the Second Embodiment of the present invention.

FIG. 18 illustrates an exemplary correspondence relationship among addresses, path MTU information of a plurality of paths, band information and scheduled time information in the Second Embodiment of the present invention.

BEST MODE FOR CARRYING OUT THE INVENTION

The following describes the First and Second Embodiments of the present invention, with reference to the drawings.

First Embodiment

Figure 1:
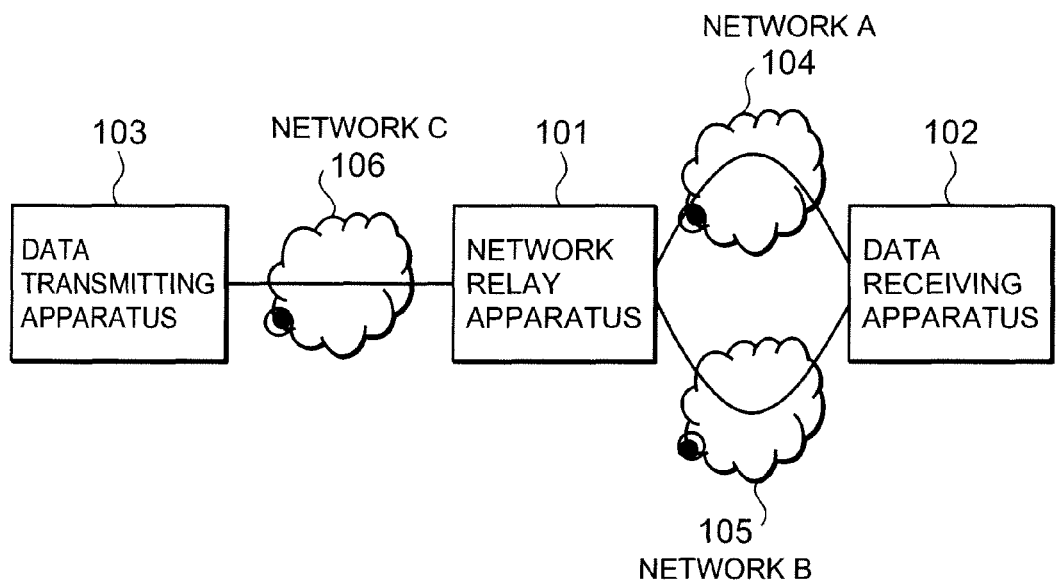
FIG. 1 illustrates an exemplary network configuration of the First Embodiment of the present invention.

Firstly, the First Embodiment of the present invention will be described below. To begin with, a network configuration of the First Embodiment of the present invention is described with reference to FIG. 1. FIG. 1 illustrates an exemplary network configuration of the First Embodiment of the present invention.

In FIG. 1, a network relay apparatus (101) relays a packet addressed to a data receiving apparatus (102). A data transmitting apparatus (103) transmits a packet to the data receiving apparatus (102) as a destination.

The network relay apparatus (101) and the data receiving apparatus (102) connect with each other via a network A (104) or a network B (105). The network relay apparatus (101) selects any one of via the network A (104) and via the network B (105) to transfer a packet to the data receiving apparatus (102).

The network relay apparatus (101) and the data transmitting apparatus (103) connect with each other via a network C (106). A packet addressed to the data receiving apparatus (102) transmitted by the data transmitting apparatus (103) is delivered to the network relay apparatus (101) via the network C (106), which is then transferred by the network relay apparatus (101). In the following description, two paths between the network relay apparatus (101) and the data receiving apparatus (102) are exemplified, although the number of paths may be three or more.

A feature of the present invention resides in that, when a plurality of paths exist, a communication apparatus as a sender is notified of a path MTU value of each of the plurality of paths. That is to say, in the case where a plurality of paths (in this example, a path via the network A (104) and a path via the network B (105)) exist between the network relay apparatus (101) and the data receiving apparatus (102), the data transmitting apparatus (103) is notified of a path MTU value of each path. Herein, any one of or both of the network relay apparatus (101) and the data receiving apparatus (102) notifies (notify) of this information (a path MTU value of each path). The data transmitting apparatus (103) is notified of the existence of the plurality of paths and further is notified of a path MTU of each path, thus using the plurality of paths effectively to transmit data.

A path MTU value between the data transmitting apparatus (103) and the data receiving apparatus (102) is determined by the respective MTU values of the network A (104), the network B (105) and the network C (106). In the following, the MTU values of the network A (104), the network B (105), and the network C (106) are denoted MTU_A, MTU_B, and MTU_C, respectively. The magnitude relationship among these network MTU values changes the path MTU (the MTU of the paths as a whole between the data transmitting apparatus 103 and the data receiving apparatus 102). Thus, the magnitude relationship of the network MTU values are classified as follows. For the purpose of avoiding complication, it is assumed in the description that the magnitude relationship of the MTU values between the network A (104) and the network B (105) is set as MTU_A≧MTU_B.

(1) MTU_B≦MTU_A≦MTU_C
(2) MTU_B≦MTU_C≦MTU_A
(3) MTU_C≦MTU_B≦MTU_A

Further, the situation also will be varied depending on whether or not each of the network relay apparatus (101), the data receiving apparatus (102), and the data transmitting apparatus (103) supports the technique according to the present invention for notifying of the multipath MTU information (a plurality of pieces of path MTU information) when a plurality of paths exist. Therefore, the following classification is performed.

(A) Supported by all communication apparatuses;
(B) Not supported by the network relay apparatus (101), and supported by the data receiving apparatus (102) and the data transmitting apparatus (103);
(C) Not supported by the network relay apparatus (102), and supported by the network relay apparatus (101) and the data transmitting apparatus (103); and
(D) Not supported by the data transmitting apparatus (103), and supported in some cases by the network relay apparatus (101) and the data receiving apparatus (102) but not supported thereby in the other cases.

The combinations of these two types of classifications will generate the following twelve cases:

(1-A) MTU_B≦MTU_A≦MTU_C supported by all apparatuses;
(1-B) MTU_B≦MTU_A≦MTU_C not supported by network relay apparatus;
(1-C) MTU_B≦MTU_A≦MTU_C not supported by data receiving apparatus;
(1-D) MTU_B≦MTU_A≦MTU_C not supported by data transmitting apparatus;
(2-A) MTU_B≦MTU_C≦MTU_A supported by all apparatuses;
(2-B) MTU_B≦MTU_C≦MTU_A not supported by network relay apparatus;
(2-C) MTU_B≦MTU_C≦MTU_A not supported by data receiving apparatus;
(2-D) MTU_B≦MTU_C≦MTU_A not supported by data transmitting apparatus;
(3-A) MTU_C≦MTU_B≦MTU_A supported by all apparatuses;
(3-B) MTU_C≦MTU_B≦MTU_A not supported by network relay apparatus;
(3-C) MTU_C≦MTU_B≦MTU_A not supported by data receiving apparatus; and
(3-D) MTU_C≦MTU_B≦MTU_A not supported by data transmitting apparatus.

The following describes each case.

Figure 2:
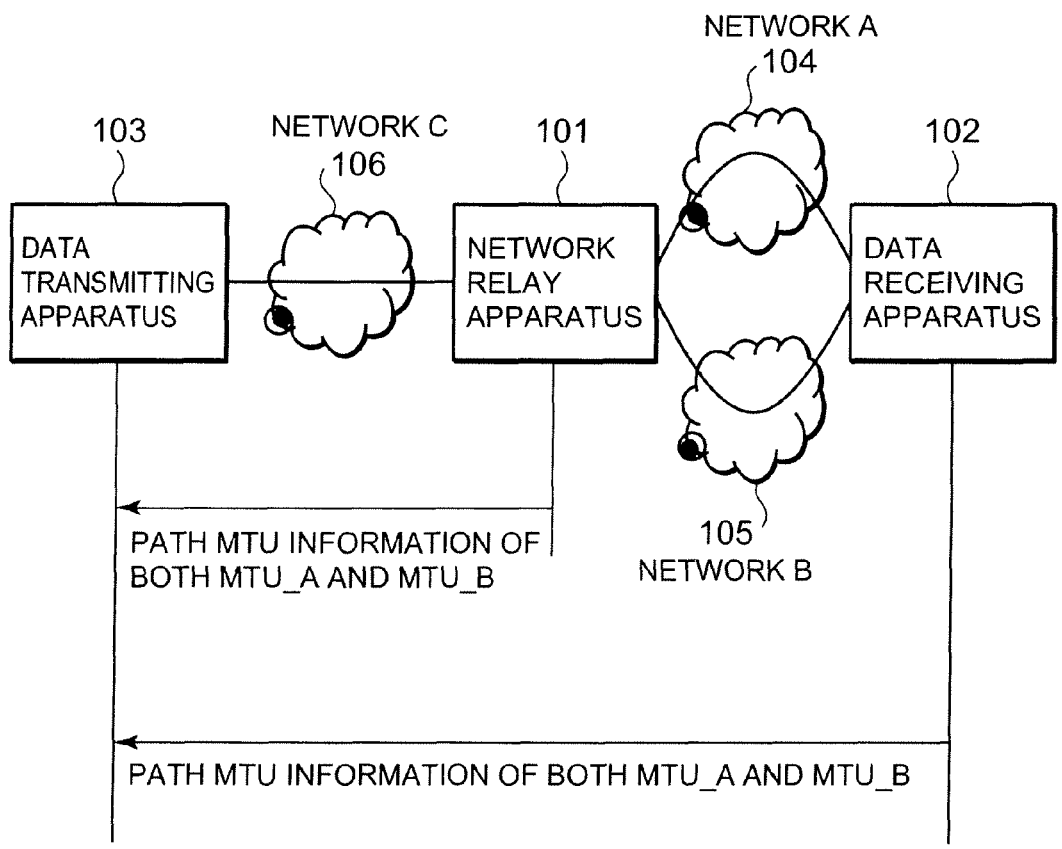
FIG. 2 illustrates a notification state of the multipath MTU information in the case of (1-A) in the First Embodiment of the present invention.

Firstly, the case of (1-A) will be described referring to FIG. 2. FIG. 2 illustrates a notification state of the multipath MTU information in the case of (1-A) in the First Embodiment of the present invention. Since the magnitude relationship of the network MTU is MTU_B≦MTU_A≦MTU_C, the path MTU is MTU_A or MTU_B. Since both of the network relay apparatus (101) and the data receiving apparatus (102) support the notification of the multipath MTU information, the data transmitting apparatus (103) can be notified of the multipath MTU information (path MTU information of both MTU_A and MTU_B). Since the data transmitting apparatus (103) also supports the multipath MTU information, the data transmitting apparatus (103) can transmit data in accordance with path MTU (MTU_A and MTU_B) of the received multipath MTU information.

Figure 3:
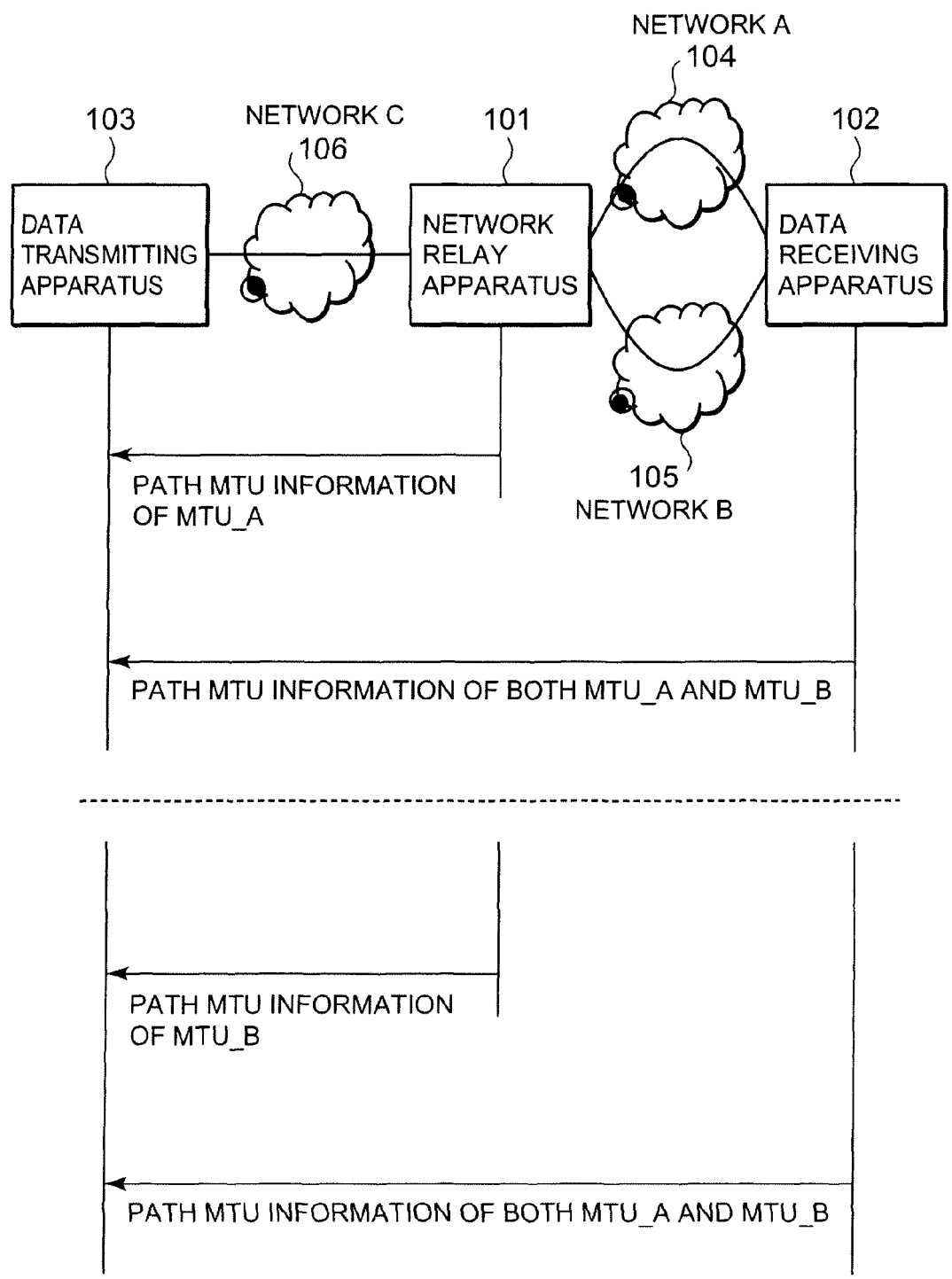
FIG. 3 illustrates a notification state of the multipath MTU information in the case of (1-B) in the First Embodiment of the present invention.

Next, the case of (1-B) will be described referring to FIG. 3. FIG. 3 illustrates a notification state of the multipath MTU information in the case of (1-B) in the First Embodiment of the present invention. Since the magnitude relationship of the network MTU is MTU_B≦MTU_A≦MTU_C, the path MTU is MTU_A or MTU_B. However, since the network relay apparatus (101) does not support (cannot notify of the multipath MTU information), the network relay apparatus (101) notifies the data transmitting apparatus (103) of a path MTU value of only one of MTU_A and MTU_B.

The network relay apparatus (101) notifies the data transmitting apparatus (103) of the path MTU value (only one value) by the Path MTU Discovery according to the conventional technique. On the other hand, since the data receiving apparatus (102) supports the multipath MTU information, the data receiving apparatus (102) notifies of values of both MTU_A and MTU_B.

Since the data transmitting apparatus (103) supports the multipath MTU information, the data transmitting apparatus (103) is notified of the multipath MTU information from the data receiving apparatus (102) as well as being notified of MTU_A from the network relay apparatus (101), similarly to the case of (1-A) the data transmitting apparatus (103) selects a packet length with consideration given to both of MTU_A and MTU_B in accordance with the path MTU of the received multipath MTU information to transmit data. When being notified of the multipath MTU information from the data receiving apparatus (102) as well as being notified of MTU_B from the network relay apparatus (101), the data transmitting apparatus (103) decides a packet length while setting a path MTU as MTU_B with consideration given to the relationship of MTU_B≦MTU_A, thus transmitting a packet.

Figure 4:
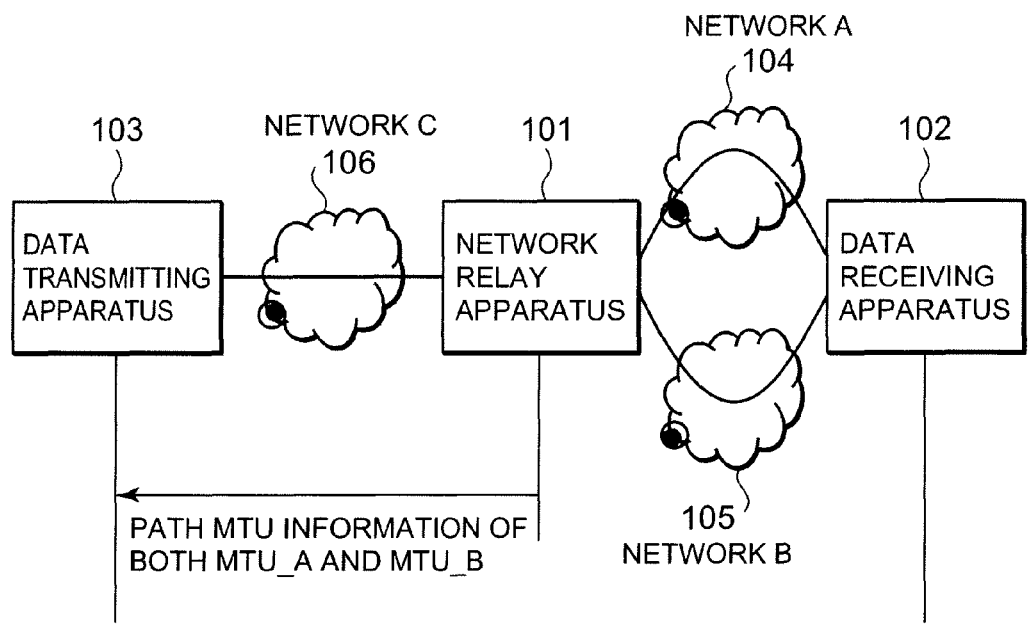
FIG. 4 illustrates a notification state of the multipath MTU information in the case of (1-C) in the First Embodiment of the present invention.

Next, the case of (1-C) will be described referring to FIG. 4. FIG. 4 illustrates a notification state of the multipath MTU information in the case of (1-C) in the First Embodiment of the present invention. Since the magnitude relationship of the network MTU is MTU_B≦MTU_A≦MTU_C, the path MTU is MTU_A or MTU_B. Since the data receiving apparatus (102) does not support the multipath MTU information, the data transmitting apparatus (103) is notified of the multipath MTU information only from the network relay apparatus (101). Similarly to the case of (1-A), the data transmitting apparatus (103) can select a packet length in accordance with a value of the path MTU (MTU_A and MTU_B) of the received multipath MTU information to transmit data.

Next, the case of (1-D) will be described. Since the magnitude relationship of the network MTU is MTU_B≦MTU_A≦MTU_C, the path MTU is MTU_A or MTU_B. However, since the data transmitting apparatus (103) does not support the multipath MTU information, the data transmitting apparatus (103) uses a path MTU value notified by the network relay apparatus (101) through the operation in the Path MTU Discovery according to the conventional technique to control a packet length for transmission. That is, when the network relay apparatus (101) notifies of the value of MTU_A, the data transmitting apparatus (103) uses the value of MTU_A as the path MTU value, whereas when the network relay apparatus (101) notifies of the value of MTU_B, the data transmitting apparatus (103) uses the value of MTU_B as the path MTU value to control a packet length.

Figure 5:
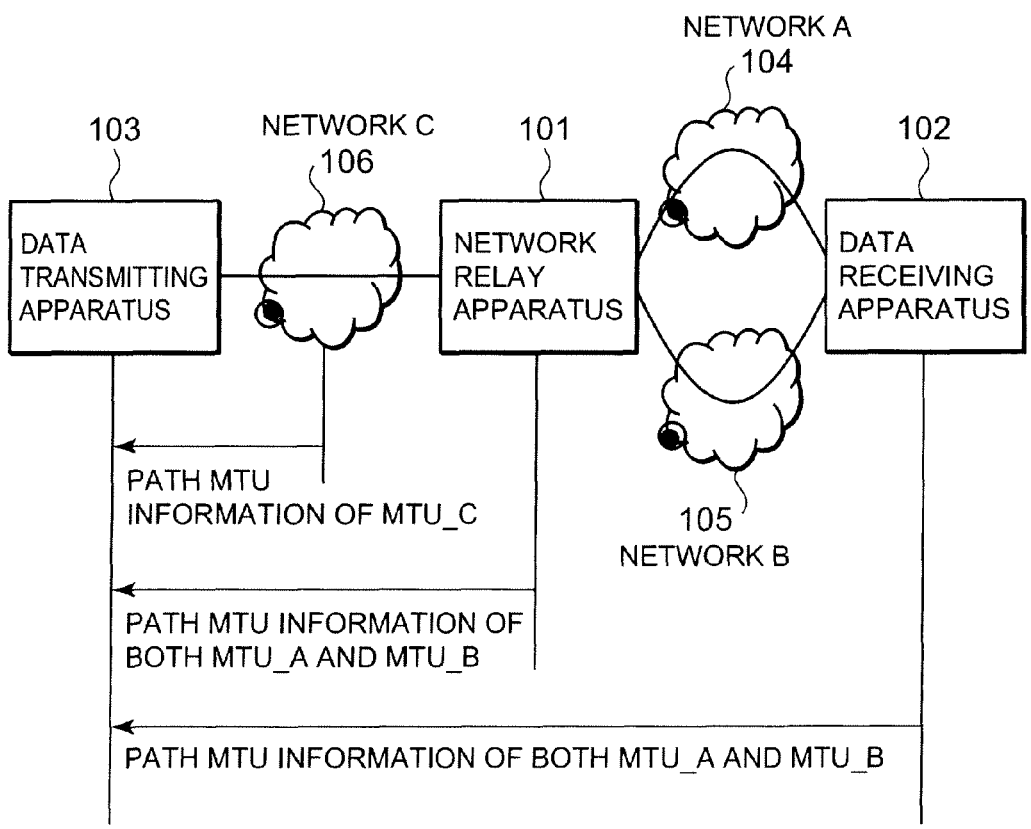
FIG. 5 illustrates a notification state of the multipath MTU information in the case of (2-A) in the First Embodiment of the present invention.

Next, the case of (2-A) will be described referring to FIG. 5. FIG. 5 illustrates a notification state of the multipath MTU information in the case of (2-A) in the First Embodiment of the present invention. Since the magnitude relationship of the network MTU is MTU_B≦MTU_C≦MTU_A, the path MTU is MTU_B or MTU_C. In this case, since all apparatuses support the multipath MTU information, the network relay apparatus (101) and the data receiving apparatus (102) notify the data transmitting apparatus (103) of the multipath MTU information (information of both MTU_A and MTU_B). On the other hand, the network C (106) notifies the data transmitting apparatus (103) of the value of MTU_C as a result of the operation of the conventional Path MTU Discovery.

The data transmitting apparatus (103) uses the multipath MTU information (information of both MTU_A and MTU_B) and MTU_C notified by the network C (106), and selects a packet length with consideration given to both MTU_B and MTU_C to transmit data. That is to say, since MTU_A has a value larger than MTU_C, the data transmitting apparatus (103) can be notified that only a value smaller than MTU_C can be delivered to the data receiving apparatus (102) as a destination, thus allowing to use both MTU_B and MTU_C as path MTU.

Figure 6:
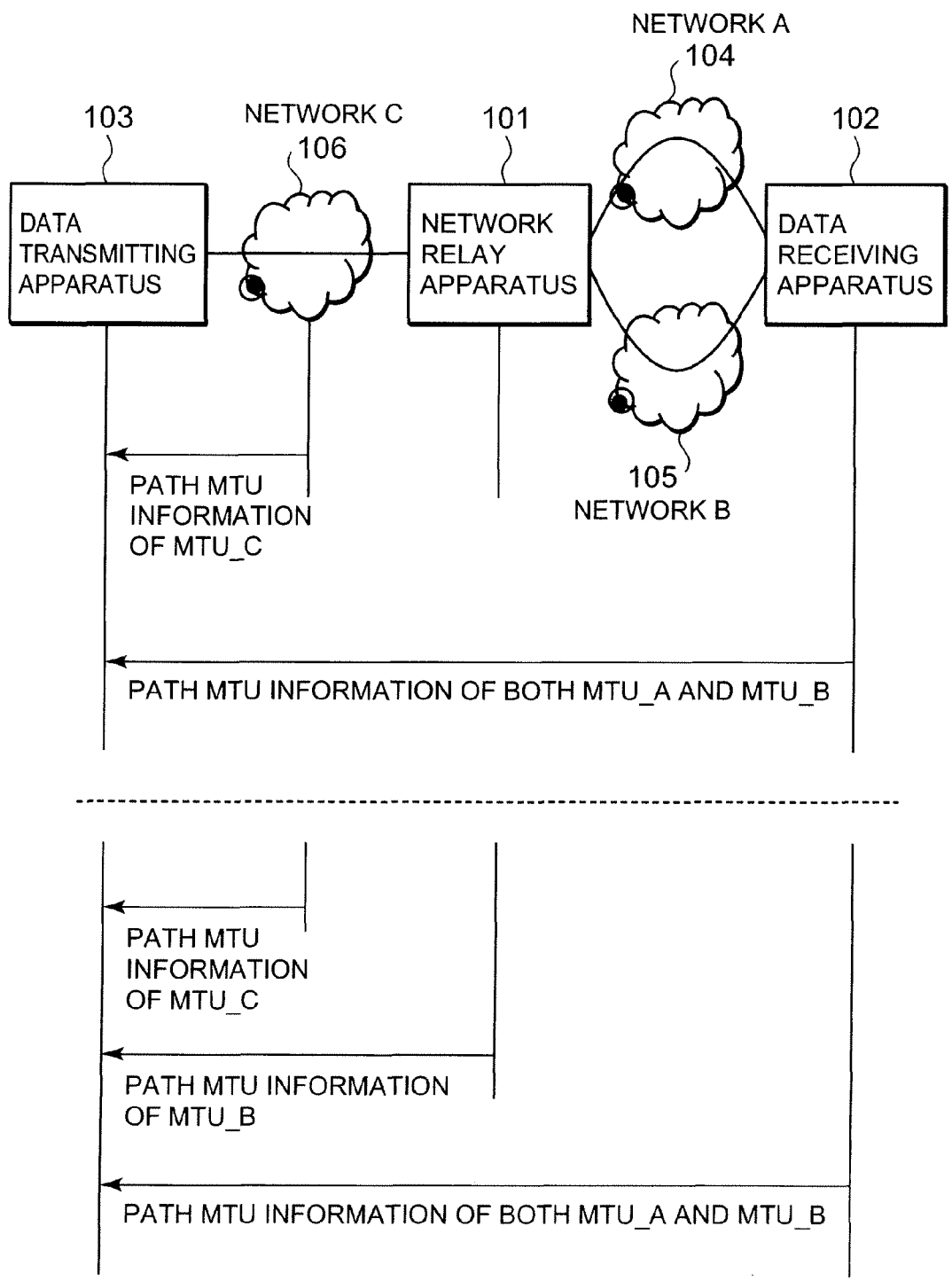
FIG. 6 illustrates a notification state of the multipath MTU information in the case of (2-B) in the First Embodiment of the present invention.

Next, the case of (2-B) will be described referring to FIG. 6. FIG. 6 illustrates a notification state of the multipath MTU information in the case of (2-B) in the First Embodiment of the present invention. Since the magnitude relationship of the network MTU is MTU_B≦MTU_C≦MTU_A, the path MTU is MTU_B or MTU_C. In this case, since the network relay apparatus (101) does not support the multipath MTU information, the network relay apparatus (101) notifies of a value of MTU_B or notifies of nothing. That is, because of the magnitude relationship of MTU_C≦MTU_A, the network relay apparatus (101) does not notify of MTU_A. On the other hand, the data receiving apparatus (102) notifies the data transmitting apparatus (103) of the multipath MTU information (information of both MTU_A and MTU_B). When being notified of MTU_B from the network relay apparatus (101), the data transmitting apparatus (103) controls a packet length while setting a value of MTU_B as path MTU and transmits a packet. In the other cases, the data transmitting apparatus (103) considers the value of both MTU_B and MTU_C similarly to (2-A) to select a packet length and transmit data.

Figure 7:
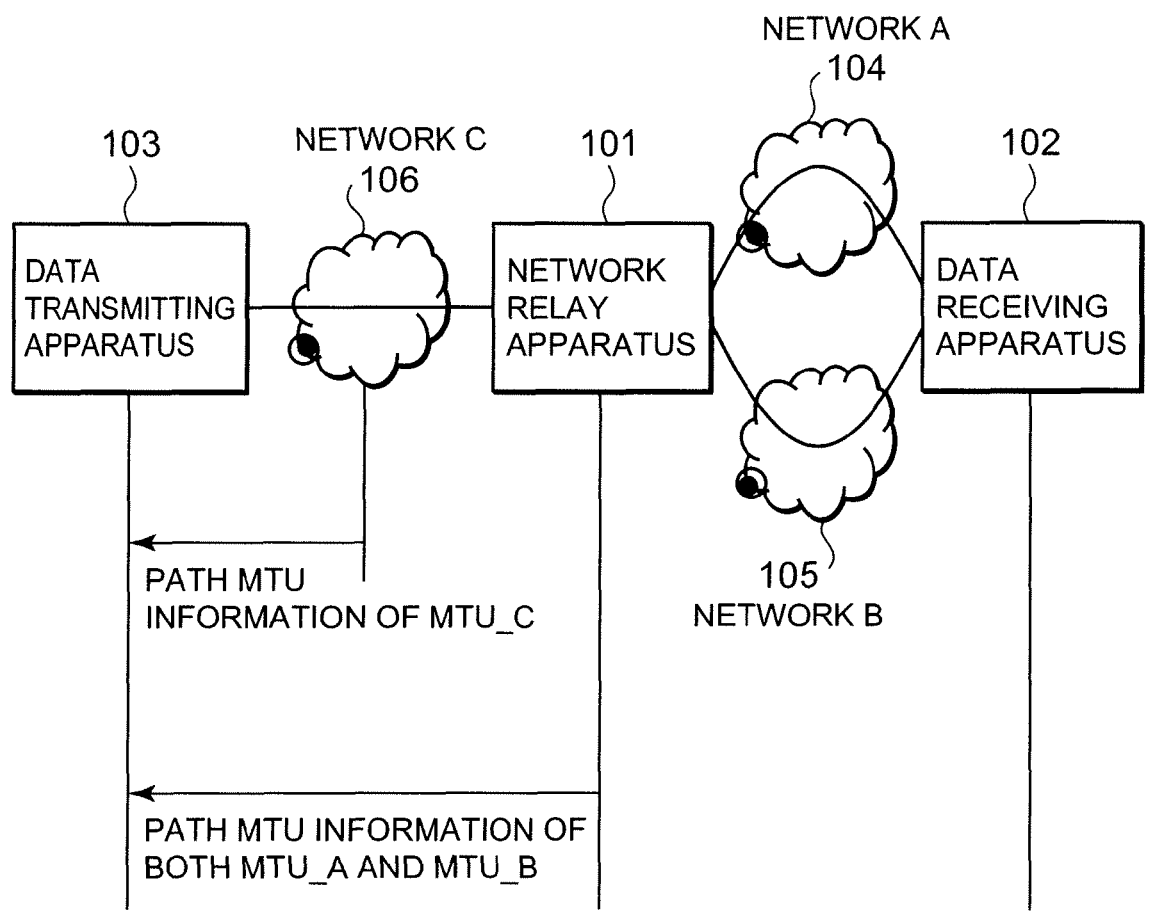
FIG. 7 illustrates a notification state of the multipath MTU information in the case of (2-C) in the First Embodiment of the present invention.

Next, the case of (2-C) will be described referring to FIG. 7. FIG. 7 illustrates a notification state of the multipath MTU information in the case of (2-C) in the First Embodiment of the present invention. Since the magnitude relationship of the network MTU is MTU_B≦MTU_C≦MTU_A, the path MTU is MTU_B or MTU_C. In this case, since the data receiving apparatus (102) does not support the multipath MTU information, the data transmitting apparatus (103) is notified of the multipath MTU information only from the network relay apparatus (101). Similarly to the case of (2-A), the data transmitting apparatus (103) can select a packet length with consideration given to values of both MTU_B and MTU_C to transmit data.

Next, the case of (2-D) will be described. Since the magnitude relationship of the network MTU is MTU_B≦MTU_C≦MTU_A, the path MTU is MTU_B or MTU_C. However, since the data transmitting apparatus (103) does not support the multipath MTU information, when the network relay apparatus 101 notifies of the value of MTU_B by the Path MTU Discovery operation according to the conventional technique, the data transmitting apparatus (103) sets the value of MTU_B as path MTU, and in the other cases sets the value of MTU_C notified from the network C (106) to control a packet length for transmission.

Next, the cases of (3-A), (3-B), (3-C), and (3-D) will be described below. Since the magnitude relationship of the network MTU is MTU_C≦MTU_B≦MTU_A, the path MTU is MTU_C. Irrespective of what communication apparatuses support the multipath MTU information or not, the data transmitting apparatus (103) sets the value of MTU_C as path MTU to control a packet length for transmission.

Figure 8:
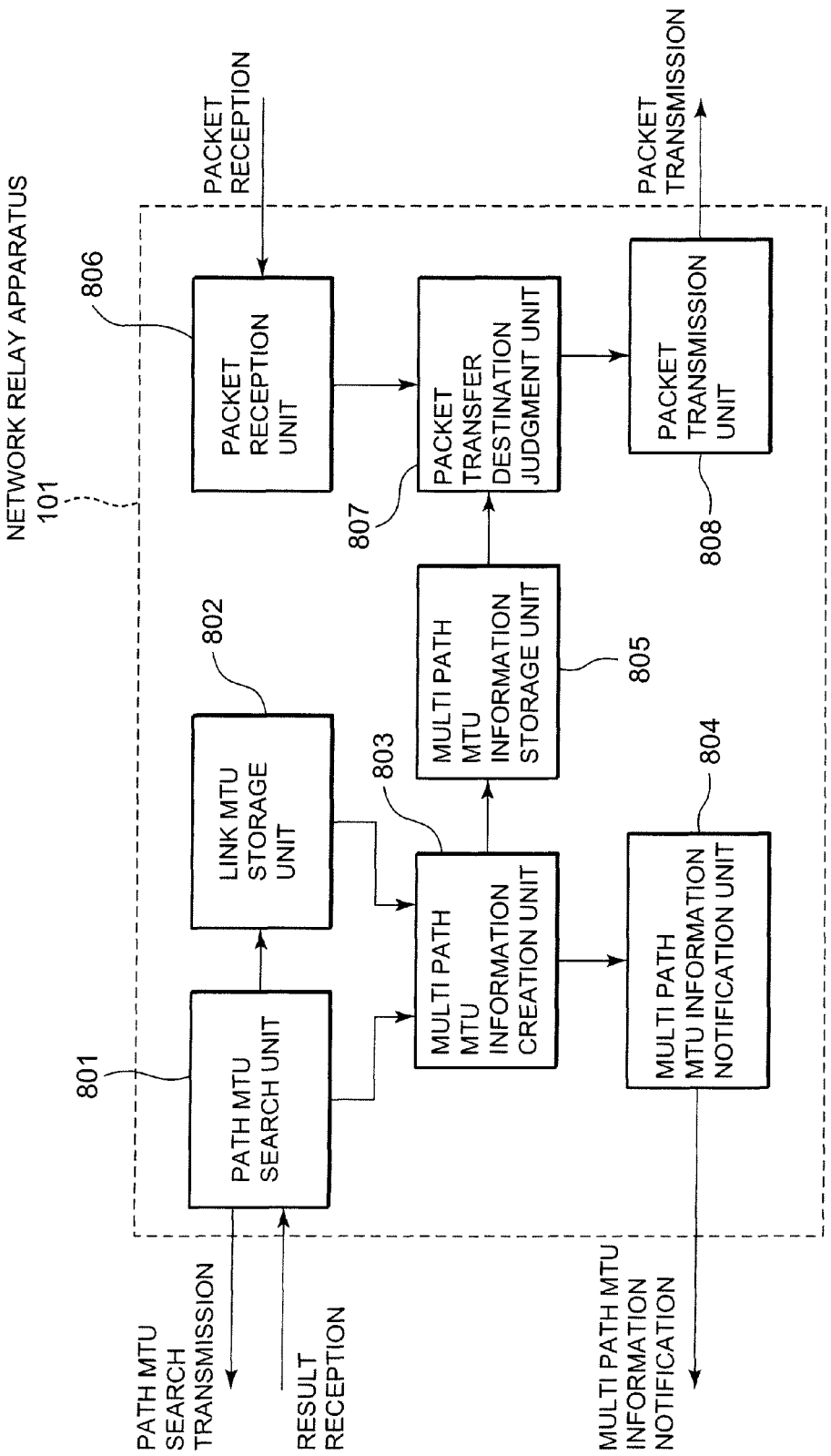
FIG. 8 is a block diagram illustrating an exemplary configuration of a network relay apparatus in the First Embodiment of the present invention.

The following describes the configuration and the operation by each of the communication apparatuses. Firstly, the configuration of the network relay apparatus will be described referring to FIG. 8. FIG. 8 is a block diagram illustrating an exemplary configuration of a network relay apparatus in the First Embodiment of the present invention. The network relay apparatus (101) of FIG. 8 includes a path MTU search unit (801), a Link MTU storage unit (802), a multipath MTU information creation unit (803), a multipath MTU information notification unit (804), a multipath MTU information storage unit (805), a packet reception unit (806), a packet transfer destination judgment unit (807), and a packet transmission unit (808).

The path MTU search unit (801) is a processing unit that examines path MTU by Path MTU Discovery or the like. The Link MTU storage unit (802) is a processing unit that stores set values of Link MTU. Herein path MTU does not exceed a value of Link MTU. The multipath MTU information creation unit (803) is a processing unit that creates multipath MTU information based on information of MTU from the path MTU search unit (801) and the Link MTU storage unit (802). The multipath MTU information contains path MTU of each of the plurality of paths.

The multipath MTU information notification unit (804) is a processing unit that transmits the multipath MTU information created by the multipath MTU information creation unit (803) to the data transmitting apparatus (103). The multipath MTU information storage unit (805) is a processing unit that stores the multipath MTU information created by the multipath MTU information creation unit (803). Using the multipath MTU information stored in the multipath MTU information storage unit (805), the network relay apparatus (101) selects a path through which a packet transferred is sent during packet transfer processing.

The packet reception unit (806) is a processing unit that receives a packet, which receives data from the data transmitting apparatus (103). The packet transfer destination judgment unit (807) is a processing unit that makes a judgment concerning to which path the received packet is sent out for transfer. During this judgment, the multipath MTU information stored in the multipath MTU information storage unit (805) is referred to. The packet transmission unit (808) is a processing unit that sends out a packet to the path determined by the packet transfer destination judgment unit (807), and sends out the packet to the data receiving apparatus (102). In the case of including a plurality of output interfaces, a plurality of packet transmission units (808) exist, for each of which Link MTU exists.

The network relay apparatus (101) creates multipath MTU information. When a packet is transmitted to a destination, the packet is sent to the destination (i.e., by the Path MTU Discovery method according to the conventional technique), whereby the path MTU to the destination can be found. Regularly or when there occurs a need to transmit a packet, a packet with a large packet length is transmitted intentionally to search the path MTU in order to use band effectively. This path MTU search processing is performed by the path MTU search unit (801).

The network relay apparatus (101) cannot transmit a packet exceeding the Link MTU of each interface. The Link MTU storage unit (802) stores the value of such Link MTU. The network relay apparatus (101) makes the multipath MTU information creation unit (803) create multipath MTU information using the path MTU value examined by the path MTU search unit (801). The multipath MTU information notification unit (804) notifies the data transmitting apparatus (103) of the multipath MTU information created by the multipath MTU information creation unit (803), and the multipath MTU information storage unit (805) stores the multipath MTU information therein.

Note here that the network relay apparatus (101) may create the multipath MTU information after receiving data from the data transmitting apparatus (103), and may notify of the same. Further, when the path situation connecting therewith changes so that a new path is added or a path is decreased, the network relay apparatus (101) may notify the data transmitting apparatus (103) of such.

The network relay apparatus (101) notifies of the multipath MTU information. In the case where a packet can be transmitted or transferred to a destination via a plurality of output interfaces (i.e., in the case where a plurality of paths exist), the network relay apparatus (101) makes the path MTU search unit (801) examine each path MTU and creates the multipath MTU information using the values. Herein, this multipath MTU information, which is used also for transfer processing by the network relay apparatus (101), can be transmitted from the multipath MTU information notification unit (804) to the data transmitting apparatus (103) so as to allow this information to be available from the sender of the data as well.

The network relay apparatus (101) performs packet transfer processing using the multipath MTU information. The network relay apparatus (101) makes the packet reception unit (806) receive the packet transmitted by the data transmitting apparatus (103), and when transferring the received packet, if a plurality of paths exist, the network relay apparatus (101) determines an output interface for sending-out using the multipath MTU information stored in the multipath MTU information storage unit (805). On the other hand, in the case where the multipath MTU information is not stored, the network relay apparatus (101) makes the path MTU search unit (801) search path MTU of each path, and makes the multipath MTU information creation unit (803) create the multipath MTU information using the information. If the multipath MTU information has been old information, the multipath MTU information is newly updated. This updating processing may be performed regularly, or may be performed when the network configuration is changed.

When making a judgment concerning a path for sending, the network relay apparatus (101) selects the path in accordance with a packet length. Statistic information may be kept concerning the packet amount sent out to each path so as not to concentrate a load on one path, and the judgment may be made based on such information. Using band information of a path, a judgment concerning the path for sending may be made in accordance with the band of each path. If a scheduled time when a path is available or is unavailable due to maintenance is known, such information may be used for judgment. The network relay apparatus (101) uses the multipath MTU information stored in the multipath MTU information storage unit (805) to make the packet transfer destination judgment unit (807) determine a sending destination of the packet, and makes the packet transmission unit (808) transfer the packet to the data receiving apparatus (102).

Figure 9:
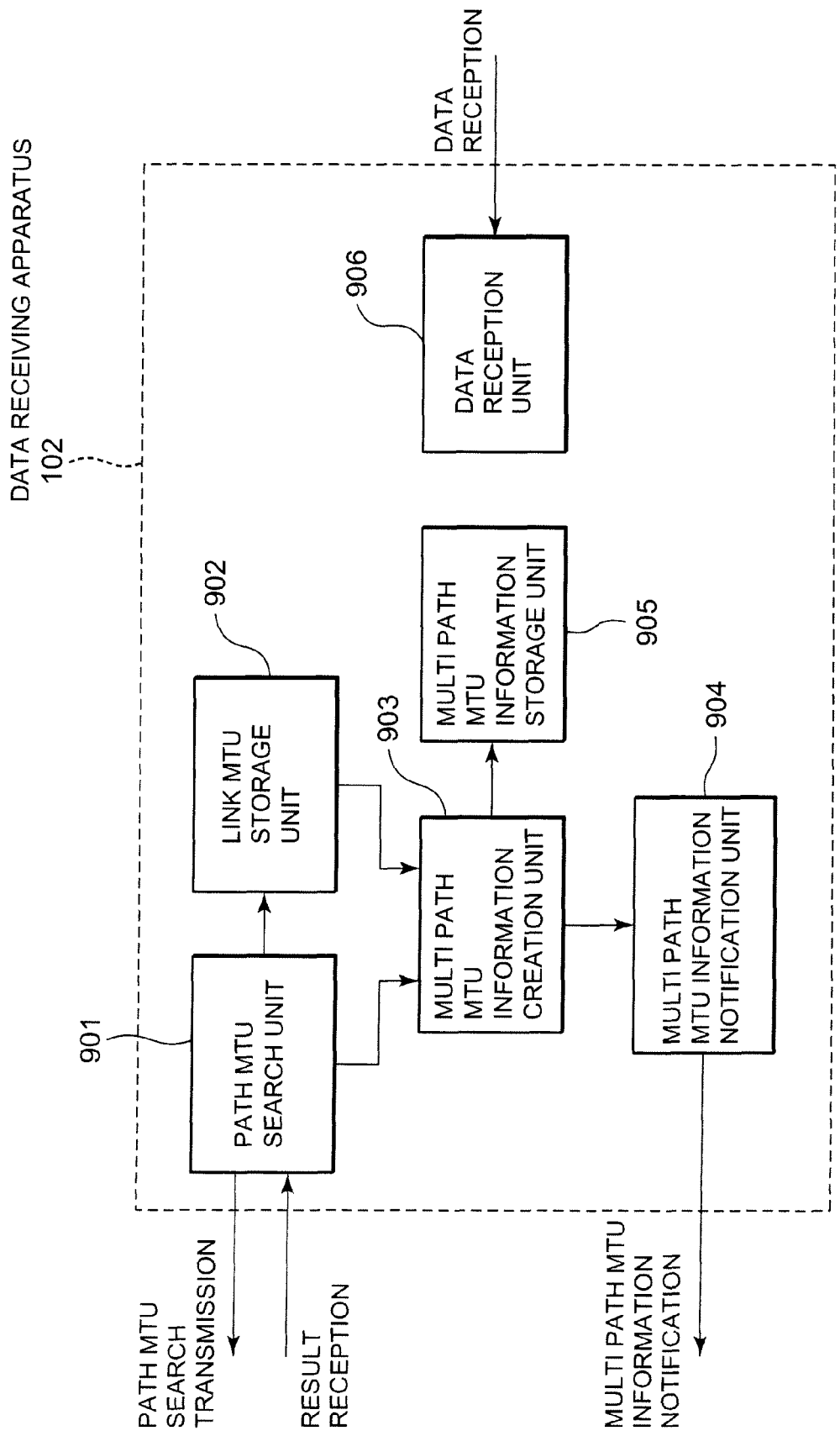
FIG. 9 is a block diagram illustrating an exemplary configuration of a data receiving apparatus in the First Embodiment of the present invention.

The following describes the configuration of the data receiving apparatus (102) referring to FIG. 9. FIG. 9 is a block diagram illustrating an exemplary configuration of a data receiving apparatus in the First Embodiment of the present invention. The data receiving apparatus (102) of FIG. 9 includes a path MTU search unit (901), a Link MTU storage unit (902), a multipath MTU information creation unit (903), a multipath MTU information notification unit (904), a multipath MTU information storage unit (905), and a data reception unit (906).

The path MTU search unit (901) is a processing unit that examines path MTU by Path MTU Discovery or the like. The Link MTU storage unit (902) is a processing unit that stores set values of Link MTU. The multipath MTU information creation unit (903) is a processing unit that creates multipath MTU information based on information of MTU from the path MTU search unit (901) and the Link MTU storage unit (902). The multipath MTU information notification unit (904) is a processing unit that transmits the multipath MTU information created by the multipath MTU information creation unit (903) to the data transmitting apparatus (103). The multipath MTU information storage unit (905) is a processing unit that stores the multipath MTU information created by the multipath MTU information creation unit (903). The data reception unit (906) is a processing unit that receives data (a packet) transmitted by the data transmitting apparatus (103).

The data receiving apparatus (102) creates multipath MTU information. When a packet is transmitted to a destination, the packet is sent to the destination (i.e., by the Path MTU Discovery method according to the conventional technique), whereby the path MTU to the destination can be found. Since the data receiving apparatus (102) knows the existence of a plurality of interfaces through which a packet can be output for transmitting the packet to the data transmitting apparatus 103 (i.e., a plurality of paths exist), the data receiving apparatus (102) can examine as to by which path the data can be transmitted more effectively. In the case where the data receiving apparatus (102) knows an opposed communication apparatus connecting with the plurality of paths (in this case, the network relay apparatus (101)), the path MTU may be searched while setting the network relay apparatus (101) as a destination. Alternatively, the path MTU may be searched while setting the data transmitting apparatus (103) as a destination.

The data receiving apparatus (102) makes the path MTU search unit (901) search a value of the path MTU, which is for notifying the data transmitting apparatus (103) thereof. The data receiving apparatus (102) can select and examine as to which one of the plurality of paths is to be used for searching the path MTU. The value of the path MTU searched by the path MTU search unit (901) and the value of the Link MTU stored in the Link MTU storage unit (902), the multipath MTU information creation unit (903) creates the multipath MTU information. The multipath MTU information created by the multipath MTU information creation unit (903) is passed to the multipath MTU information notification unit (904), and then the multipath MTU information notification unit (904) notifies the data transmitting apparatus (103) of the multipath MTU information. The multipath MTU information is further passed to the multipath MTU information storage unit (905) and is stored therein.

Herein, the multipath MTU information notification unit (904) may notify the data transmitting apparatus (103) of the multipath MTU information stored in the multipath MTU information storage unit (905) regularly. The data receiving apparatus (102) may create the multipath MTU information after receiving data from the data transmitting apparatus (103), and may notify of the same. Further, when the path situation connecting therewith changes so that a new path is added or a path is decreased, the data receiving apparatus (102) may notify the data transmitting apparatus (103) of such.

Further, the data receiving apparatus (102) notifies of the multipath MTU information. In the case where the data receiving apparatus (102) has a plurality of its own interfaces, through any of which a packet from the data transmitting apparatus (103) can be delivered, the data receiving apparatus (102) notifies the data transmitting apparatus (103) of the multipath MTU information so as to allow the plurality of paths to be used effectively. This notification may be performed regularly, or performed when the state of the multipath changes. To notify of such when the path situation changes is desirable for the effective usage of the network band.

Figure 10:
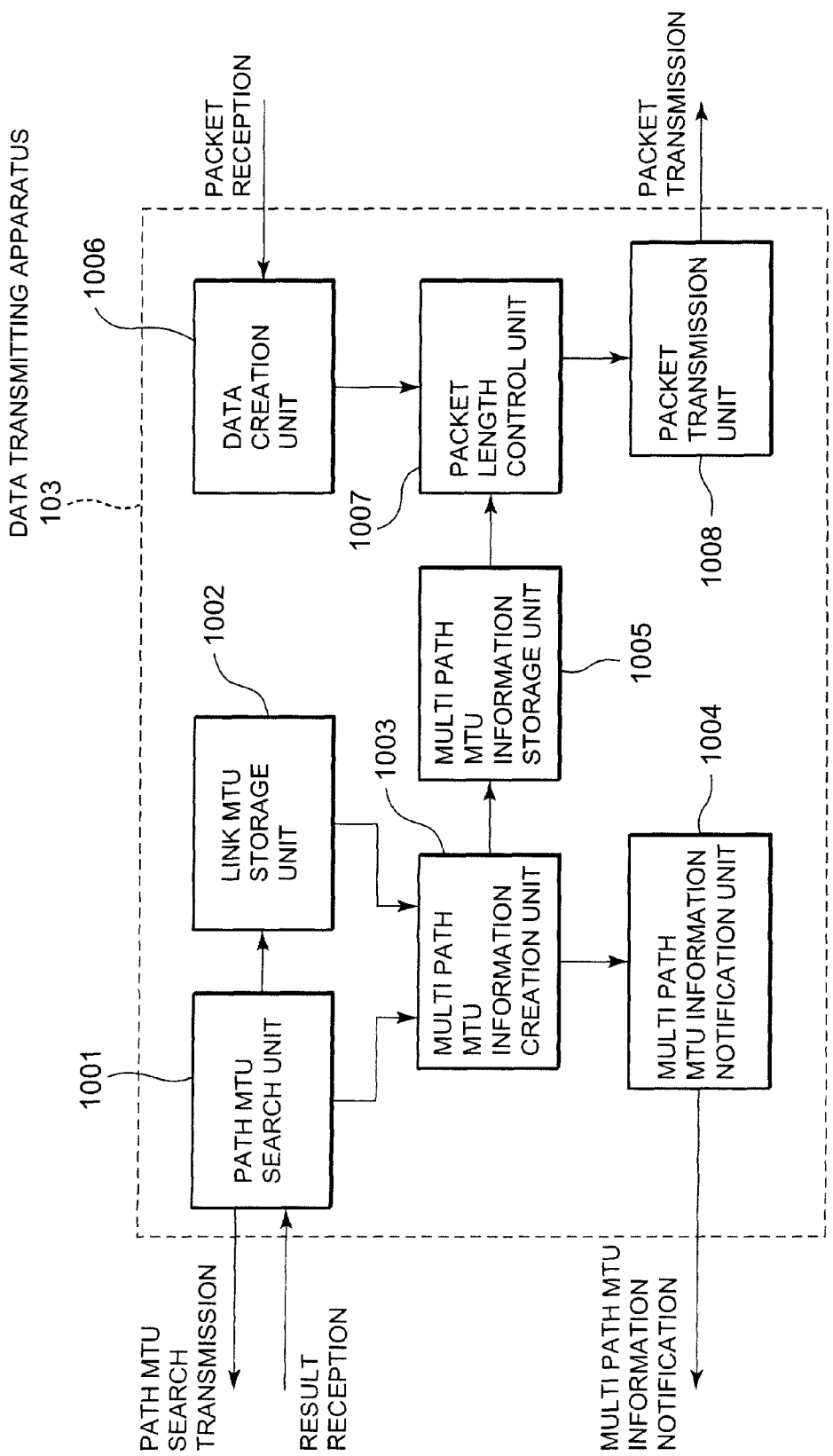
FIG. 10 is a block diagram illustrating an exemplary configuration of a data transmitting apparatus in the First Embodiment of the present invention.

The following describes the configuration of the data transmitting apparatus (103) referring to FIG. 10. FIG. 10 is a block diagram illustrating an exemplary configuration of a data transmitting apparatus in the First Embodiment of the present invention. The data transmitting apparatus (103) of FIG. 10 includes a path MTU search unit (1001), a Link MTU storage unit (1002), a multipath MTU information setting unit (1003), a multipath MTU information reception unit (1004), a multipath MTU information storage unit (1005), a data creation unit (1006), a packet length control unit (1007), and a packet transmission unit (1008).

The path MTU search unit (1001) is a processing unit that examines path MTU by Path MTU Discovery or the like. The Link MTU storage unit (1002) is a processing unit that stores set values of Link MTU. The multipath MTU information setting unit (1003) creates multipath MTU information based on information of the multipath MTU information received by the multipath MTU information reception unit (1004), a value of path MTU acquired by the path MTU search unit (1001), and the MTU value from the Link MTU storage unit (1002), and pass the same to the multipath MTU information storage unit (1005). The multipath MTU information reception unit (1004) is a processing unit that receives the multipath MTU information notified from the network relay apparatus (101) and the data receiving apparatus (102). The multipath MTU information storage unit (1005) is a processing unit that stores the multipath MTU information created by the multipath MTU information setting unit (1003). The data creation unit (1006) creates data transmitted to the data receiving apparatus (102). The packet length control unit (1007) is a processing unit that determines a packet length when the created data is sent out as a packet. Using the multipath MTU information stored in the multipath MTU information storage unit (1005), the packet length control unit (1007) controls the packet length during the packet transmission processing. That is, the packet length control unit (1007) uses the multipath MTU information stored in the multipath MTU information storage unit (1005) to decide the packet length. The packet transmission unit (1008) is a processing unit that sends out a packet in accordance with the packet length determined by the packet length control unit (1007), which sends out the packet to the data receiving apparatus (102).

The data transmitting apparatus (103) receives the multipath MTU information and stores the same for use to control a packet length. As described for the classification of the magnitude relationship of the path MTU and supported or not-supported by each apparatus of the multipath MTU information, a path MTU value of a path between the data transmitting apparatus (103) and the network relay apparatus (101) (i.e., MTU_C) becomes important for deciding a packet length in some cases. The data transmitting apparatus (103) receives the multipath MTU information from any one of or both of the network relay apparatus (101) and the data receiving apparatus (102). The data transmitting apparatus (103) further receives a result of the path search by the path MTU search unit (1001). Using such information, the multipath MTU information setting unit (1003) creates the multipath MTU information and stores the same in the multipath MTU information storage unit (1005).

The data transmitting apparatus (103) determines a packet length using the multipath MTU information, and transmits data. The data transmitting apparatus (103) makes the data creation unit (1006) create the data to be transmitted to the data receiving apparatus (102). When the data created by the data creation unit (1006) is delivered as a packet, the packet length control unit (1007) determines the packet length thereof. When determining the packet length, the packet length control unit (1007) uses the multipath MTU information stored in the multipath MTU information storage unit (1005).

It is desirable that the packet length is determined so as to enable the effective use of a plurality of path bands. The use of the path MTU with only a smaller value fails to use the network band with a larger path MTU effectively. On the other hand, the use of the path MTU with only a larger value fails in a packet flowing through a network with smaller path MTU, which means a failure in the effective use of a plurality of existing paths. Therefore, it is desirable to control the packet length so that a load can be distributed (i.e., the paths can be distributed) instead of using only one of the path MTU values of the plurality of existing paths. Further, it is also important to consider a feature of the transmitted data. For instance, a packet length of data with a high priority is controlled so as to let it flow into a network with larger path MTU, whereas packets for others being made smaller. Alternatively, a packet such as User Datagram Protocol (UDP), which should not be fragmented, may be controlled to correspond to larger path MTU by priority.

The following describes a method for notifying of the multipath MTU information. Although a message exclusively used for the notification of the multipath MTU information can be defined, the following describes a method of expanding Destination Option Header of an extension header. The Destination Option Header is specified by RFC2460.

The use of the Destination Option Header allows the multipath MTU information to be added to a normal data packet or the multipath MTU information to be added to Packet Too Big as an ICMP message used for Path MTU Discovery. When a communication apparatus not supporting the multipath MTU information receives a packet to which this multipath MTU information is added, this communication apparatus can ignore only the option portion of the multipath MTU information added by the Destination Option Header. Therefore, the use of Destination Option Header does not affect an existing communication apparatus that does not support the present invention, but enables the use of the multipath MTU information.

The following describes an example where the multipath MTU information is added to the Destination Option Header, referring to FIG. 11. FIG. 11 illustrates an exemplary Destination Option Header for delivering the multipath MTU information in the First Embodiment of the present invention. In FIG. 11, Next Header (1101), Hdr Ext Length (1102), Option Type (1103), and Opt Data Length (1104) are regions specified by RFC2460. In the above Option Type (1103), a value indicating that the information is the multipath MTU information is set. In accordance with this setting value, if the data transmitting apparatus (103) supports the multipath MTU information, this information is processed, whereas if the data transmitting apparatus (103) does not support the multipath MTU information, this information is simply ignored.

In the region of a path information size (1105) of FIG. 11, a path information size (capacity) is set. The multipath MTU information including the path MTU is described here. However, band information relating to each MTU or scheduled time information when each path becomes available or unavailable can be included in addition to this path MTU information as described later. More specifically, the path information size is 4 bytes when only the path MTU is included, 8 bytes when any one of the band information and the scheduled time information is included, and 12 bytes when both of them are included. The multipath MTU information also may include information relating to paths other than those described above.

In the region of the path number (1106) of FIG. 11, the number of paths is set. Since two paths exist in the above-described example, the value of path number is set as 2 in this case. In the case of three or more paths, the number of paths is set in this region. In the region of a flag (1107) of FIG. 11, a flag is set. This flag enables the distinction of information types, for example, the information following this flag shows a value of path MTU, band information, or scheduled time information, for example. For instance, the flag is desirably determined in advance as in "0" representing path MTU information, "1" representing band information and "2" representing scheduled time information. In the region of a path MTU (1108) of FIG. 11, values of the path MTU (MTU_A and MTU_B) are set.

FIG. 12 illustrates an exemplary Destination Option Header where the multipath MTU information includes band information and scheduled time information. As described above, the types of information inserted in the multipath MTU information can be distinguished by flags. FIG. 12 illustrates the multipath MTU information including a value of path MTU, band information and scheduled time information inserted therein. However, other types of information also can be used by defining flag values therefor. Any one of the band information and the scheduled time information may be included, or both of them may be included. The network relay apparatus (101) and the data receiving apparatus (102) create the multipath MTU information so as to include these types of information therein.

As the band information, a value set beforehand for a communication apparatus may be used, for example. This is because the band will change with a network with which the communication apparatus connects. The communication apparatus may measure the band actually, and a result of the measurement may be included in the multipath MTU information. As the scheduled time information also, a value set beforehand for a communication apparatus may be used, for example. For instance, when a schedule for network maintenance is announced, it can be considered that such information is set for the communication apparatus, so that this set value can be used for the scheduled time information. The scheduled time information may include a time or a time period when the network is unavailable, or may include a time from which the use of the network starts and an available time period.

The following describes an example where the multipath MTU information including the band information is used, with reference to FIG. 1. In the network relay apparatus (101) and the data receiving apparatus (102), the band information may be manually set by an operator, for example. Alternatively, the band information may be acquired by routing protocol, for example. The band may be automatically measured actually.

For instance, it is assumed that the path A has a transmission rate at the band of 10 Mbps and the path B has a transmission rate at the band of 1 MBps. The network relay apparatus (101) and the data receiving apparatus (102) transmit the multipath MTU information including this band information to the data transmitting apparatus (103). The data transmitting apparatus (103) receiving this multipath MTU information transmits a packet adjusted to MTU_A and a packet adjusted to MTU_B at a ratio of 10:1 in accordance with the band information included in the received multipath MTU information. That is, not only the path MTU information but also the band information combined for use allows the data transmitting apparatus (103) to obtain much information for controlling a packet length, thus making it possible to control the packet length more effectively.

The following describes an example where the multipath MTU information is used including the scheduled time information indicating the time when each path becomes available or unavailable, with reference to FIG. 1. In the network relay apparatus (101), the scheduled time information may be manually set by an operator, for example. Alternatively, the scheduled time information may be acquired by the notification from the data receiving apparatus (102).

For instance, it is assumed that only the path B is available, and the network relay apparatus (101) knows that the path A will become available at 8:10 PM where the current time is 8:00 PM. This situation may occur, for example, when a schedule for network construction or maintenance is announced beforehand. The network relay apparatus (101) transmits to the data transmitting apparatus (103) the scheduled time information (8:10 PM) when the path A becomes available as the multipath MTU information. Upon receipt of the scheduled time information when the path A becomes available, the data transmitting apparatus (103) can set the switching of the packet length control unit (1007) at the scheduled time beforehand, so that concurrently with or in a short time from the timing when the path A becomes available, network resources in both of the paths A and B can be used effectively.

Alternatively, it is assumed that both of the path A and the path B are available, and the network relay apparatus (101) or the data receiving apparatus (102) knows that the path A will become unavailable at 8:10 PM where the current time is 8:00 PM. The network relay apparatus (101) or the data receiving apparatus (102) transmits to the data transmitting apparatus (103) the scheduled time information (8:10 PM) when the path A becomes unavailable as the multipath MTU information. Upon receipt of the scheduled time information when the path A becomes unavailable, the data transmitting apparatus (103) can be kept from transmitting a packet with a packet length larger than MTU_B when the path A becomes unavailable. Therefore, it can avoid the situation such that notification of a large packet length is received by an error message and a packet is transmitted again, or fragment processing occurs in the network relay apparatus (101), so that network resources can be used effectively. Note here that the time may be designated as 10 minutes later from now, for example. The time may be designated in the units of minutes as described above, or in the units of seconds or milliseconds.

Next, a method for finding multipath MTU will be described. The multipath MTU finding method is a method to know the multipath state and a MTU value of each path by receiving the multipath MTU information. That is, the method includes: a multipath MTU information creation step of creating path MTU information of each of the plurality of paths as the multipath MTU information by any one or both of the network relay apparatus (101) and the data receiving apparatus (102); a multipath MTU information notification step of notifying the data transmitting apparatus (103) of the created multipath MTU information; a multipath MTU information reception step of receiving the multipath MTU information including path MTU information of each path by the data transmitting apparatus (103); and a multipath MTU information analysis step of analyzing the received multipath MTU information by the data transmitting apparatus (103). These steps are executed, whereby the data transmitting apparatus (103) can find path MTU information of each of the plurality of paths in the network. After the analysis of the multipath MTU information, a packet length is appropriately set using each piece of path MTU information, whereby the data transmitting apparatus (103) can use the plurality of paths effectively.

Next, a multipath MTU finding system will be described. The multipath MTU finding system is a communication system made up of the network relay apparatus (101) or the data receiving apparatus (102) that creates and notifies the multipath MTU information, and the data transmitting apparatus (103) that receives the notified multipath MTU information and uses the same. That is, in the packet communication system, any one or both of the network relay apparatus (101) and the data receiving apparatus (102) creates path MTU information of each of the plurality of paths as the multipath MTU information, notifies the data transmitting apparatus (103) of the created multipath MTU information, and the data transmitting apparatus (103) receives and analyzes the multipath MTU information including path MTU information of each path. Thereby the data transmitting apparatus (103) can acquire path MTU information of each of the plurality of paths, and set a packet length appropriately using each piece of path MTU information, whereby the data transmitting apparatus (103) can use the plurality of paths effectively.

As described above, according to the First Embodiment of the present invention, in the case where a routing path includes multipath, a packet relay node or a reception node creates multipath MTU information including path MTU information of each path, and notifies a packet sender node of the multipath MTU information. Thereby the packet sender node can set an appropriate packet length in the multipath state, thus enabling the effective use of network resources.

Second Embodiment

Figures 13, 14, 15:
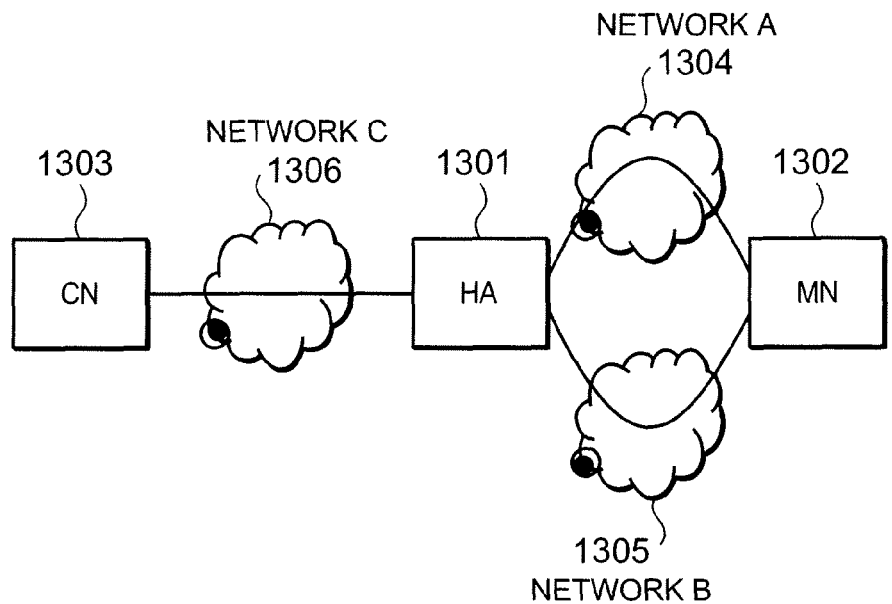
FIG. 13 illustrates an exemplary network configuration of the Second Embodiment of the present invention.
FIG. 14 illustrates an exemplary correspondence relationship between care-of addresses of mobile nodes and path MTU information in the Second Embodiment of the present invention.
FIG. 15 illustrates an exemplary correspondence relationship between a home address and care-of addresses in the Second Embodiment of the present invention.

The following describes the Second Embodiment of the present invention. FIG. 13 illustrates an exemplary network configuration of the Second Embodiment of the present invention. As can be seen from the comparison between the network configuration of FIG. 13 in the Second Embodiment of the present invention and the network configuration of FIG. 1 in the First Embodiment of the present invention, a home agent (1301) operates as the network relay apparatus (101), a mobile node (1302) operates as the data receiving apparatus (102), and a correspondent node (CN) (1303) operates as the data transmitting apparatus (103) in the Second Embodiment of the present invention.

The home agent (1301) is a network relay apparatus that, upon receipt of a packet addressed to a home address of the mobile node (1302), transfers the packet to a care-of address of the mobile node (1302). In FIG. 13, the home agent (1301) and the mobile node (1302) connect with each other via a network A (1304) and a network B (1305). For instance, it can be assumed that the network A is a mobile phone network, and the network B is a wireless LAN (e.g., IEEE 802.11b). The home agent (1301) connects with the correspondent node (1303) via a network C (1306). For instance, the network C may be the Internet.

The mobile node (1302) receives a packet transmitted from the correspondent node (1303) via the home agent (1301). The mobile node (1302) connects with the home agent (1301) via each of the network A (1304) and the network B (1305).

The correspondent node (1303) transmits a packet to the home address of the mobile node (1302). The packet transmitted to the home address is transferred to the care-of address via the home agent (1301), and is delivered to the mobile node (1302).

Meanwhile, the mobile node (1302) registers a plurality of care-of addresses with the home agent (1301). The mobile node (1302) connects with the network A (1304) and the network B (1305), and registers the home addresses of these networks as their care-of addresses with the home agent (1301). Herein, the respective care-of addresses are denoted as CoA_A and CoA_B. In the home agent (1301), the two care-of addresses CoA_A and CoA_B are registered for one home address HoA of the mobile node (1302). Thereby, when receiving a packet addressed to the home address of the mobile node (1302), the home agent (1301) can select whether the packet is transferred to CoA_A via a path A (via the network A) or to CoA_B via a path B (via the network B). The home agent (1301) may select a path in accordance with their packet lengths. The home agent (1301) may select each path of the plurality of paths so that a load on the paths can be distributed, thus enabling effective use of the plurality of paths.

Advantages of the mobile node (1302) connecting with a plurality of networks will be described below. For instance, when the mobile node (1302) communicates wirelessly, larger data is hard to be transmitted because the band of a wireless network is smaller than that of a wired network in general. To cope with this, the mobile node (1302) uses the plurality of wireless paths to transmit data, thus enabling the communication of more data than in a single wireless path.

Next, the multipath MTU information created by the home agent (1301) will be described below. FIG. 14 illustrates an exemplary correspondence relationship between the care-of addresses of the mobile nodes and the path MTU information in the Second Embodiment of the present invention. As illustrated in FIG. 14, the home agent (1302) understands the correspondence relationship between each address and path MTU information. In this example, the correspondence relationship is set such that a value of the path MTU with CoA_A (1401) as a destination is MTU_A (1403), and a value of the path MTU with CoA_B (1402) as a destination is MTU_B (1404).

FIG. 15 illustrates an exemplary correspondence relationship between a home address and care-of addresses in the Second Embodiment of the present invention. The mobile node (1302) transmits a binding update message to notify of the correspondence relationship between a home address and care-of addresses. In this illustrated example, two care-of addresses CoA_A (1502) and CoA_B (1503) exist corresponding to HoA (1501) as a home address.

Based on the information, the home agent (1301) can generate multipath MTU information where two path MTUs including MTU_A (1602) and MTU_B (1603) are set as path MTUs of the packet addressed to HoA (1601) as a home address. The home agent (1301) transmits this multipath MTU information to the correspondent node (1303). As a data format for transmitting the multipath MTU information, Destination Option Header (see FIG. 11) described in above the First Embodiment can be used, for example.

The data receiving apparatus (1302) also can create multipath MTU information similarly to the home agent (1301). FIG. 17 illustrates a correspondence relationship including band information and scheduled time information, which is obtained by extending the correspondence relationship of FIG. 14. FIG. 18 illustrates exemplary multipath MTU information including band information and scheduled time information. As a data format for transmitting to the correspondent node (1303) the multipath MTU information including band information and scheduled time information, Destination Option Header (see FIG. 12) described in the above First Embodiment can be used, for example.

As described above, according to the Second Embodiment of the present invention, a home agent can operate as the network relay apparatus in the above-described First Embodiment, a mobile node can operate as the data receiving apparatus in the above-described First Embodiment, and a data transmitting apparatus can operate as the correspondent node in the above-described First Embodiment.

In the above-described embodiments, the functions of the respective communication apparatuses are illustrated using block diagrams. These functions, however, can be implemented by making a computer execute a hardware and/or software (program).

The respective functional blocks used for the above description of embodiments of the present invention can be typically implemented by a LSI as an integrated circuit. They may be individually made into one chip, or may be made into one chip so as to include a part or the whole thereof. The Large Scale Integration (LSI) referred to herein may be called an Integrated Circuit (IC), a system LSI, a super LSI, or an ultra LSI depending on the degree of integration.

The technique for implementing the integrated circuit is not limited to LSI, and may be implemented by a dedicated circuit or a general-purpose processor. Also, a Field Programmable Gate Array (FPGA) enabling programming after the LSI fabrication, or a re-configurable processor that can be reconfigured concerning the connection and configuration of a circuit cell within a LSI may be used.

Moreover, if any integrated circuit technique is developed that can replace LSI by the development of semiconductor technique or using derivative different technique, the integration of functional blocks can be naturally performed using such technique. For instance, biotechnology may be applied thereto.

INDUSTRIAL APPLICABILITY

The present invention has an effect of, in a multipath state, allowing a packet sender node to set an appropriate packet length so that the network resources can be utilized effectively, which cannot be dealt with the conventional path MTU discovery methods. The present invention is applicable to a MTU discovery technique and a packet transmission technique in multipath.

The invention claimed is:

1. A network relay apparatus that relays a packet in a packet communication system including nodes and links, comprising:
    a path MTU search section that, when a plurality of paths exist as a routing path of the packet, searches path MTU information of each of the plurality of paths;
    a multipath MTU information creation section that creates multipath MTU information including the path MTU information of each of the plurality of paths searched by the path MTU search section and further including scheduled time information on availability/non-availability of each of the plurality of paths; and
    a multipath MTU information notification section that transmits the multipath MTU information to a sender of the packet so that the sender can select, based on the multipath MTU information, path MTU information from among the path MTU information of each of the plurality of paths which corresponds to a desired routing path when a situation of the plurality of paths changes.

2. The network relay apparatus according to claim 1, having a function as a home agent.

3. A data receiving apparatus that receives a packet in a packet communication system including nodes and links, comprising:
    a path MTU search section that, when a plurality of paths exist as a routing path of the packet, searches path MTU information of each of the plurality of paths;
    a multipath MTU information creation section that creates multipath MTU information including the path MTU information of each of the plurality of paths searched by the path MTU search section and further including scheduled time information on availability/non-availability of each of the plurality of paths; and
    a multipath MTU information notification section that transmits the multipath MTU information to a sender of the packet so that the sender can select, based on the multipath MTU information, path MTU information from among the path MTU information of each of the plurality of paths which corresponds to a desired routing path when a situation of the plurality of paths changes.

4. The data receiving apparatus according to claim 3, having a function as a mobile node.

5. The data receiving apparatus according to claim 3, wherein the multipath MTU information creation section creates the multipath MTU information after receiving the packet from the sender.

6. A data transmitting apparatus that transmits a packet in a packet communication system including nodes and links, comprising:
- a multipath MTU information reception section that, when a situation of a plurality of paths existing as a routing path of the packet changes, receives multipath MTU information including path MTU information of each of the plurality of paths and further including scheduled time information on availability/non-availability of each of the plurality of paths from a network relay apparatus that relays the packet or a data receiving apparatus that receives the packet; and
- a packet length control section that selects, based on the multipath MTU information received by the multipath MTU information reception section, path MTU information from among the path MTU information of each of the plurality of paths which corresponds to a desired routing path, and determines a packet length of the packet based on the selected path MTU information.

7. The data transmitting apparatus according to claim 6, having a function as a correspondent node.

8. A multipath MTU finding method in which, in a packet communication system including nodes and links, a data transmitting apparatus as a sender of a packet acquires path MTU information for determining a packet length of the packet, the packet being relayed by a network relay apparatus and transmitted to a data receiving apparatus, comprising the steps of:
- a path MTU search step of, when a plurality of paths exist as a routing path of the packet, searching path MTU information of each of the plurality of paths by the network relay apparatus or the data receiving apparatus;
- a multipath MTU information creation step of creating, by the network relay apparatus or the data receiving apparatus, multipath MTU information including the path MTU information of each of the plurality of paths searched in the path MTU search step and further including scheduled time information on availability/non-availability of each of the plurality of paths;
- a multipath MTU information notification step of transmitting, by the network relay apparatus or the data receiving apparatus, the multipath. MTU information to the sender of the packet when a situation of the plurality of paths changes;
- a multipath MTU information reception step of receiving, by the data transmitting apparatus, when the situation of the plurality of paths existing as the routing path of the packet changes, the multipath MTU information including the path MTU information of each of the plurality of paths and further including the scheduled time information on the availability/non-availability of each of the plurality of paths from the network relay apparatus or the data receiving apparatus; and
- a packet length control step of selecting by the data transmitting apparatus, based on the multipath MTU information received in the multipath MTU information reception step, path MTU information from among the path MTU information of each of the plurality of paths which corresponds to a desired routing path, and determining, by the data transmitting apparatus, the packet length of the packet in accordance with the selected path MTU information.

9. A multipath MTU finding system n which, in a packet communication system including nodes and links, a data transmitting apparatus as a sender of a packet acquires path MTU information for determining a packet length of the packet, the packet being relayed by a network relay apparatus and transmitted to a data receiving apparatus,
wherein the data transmitting apparatus comprises:
- a multipath MTU information reception section that, when a situation of a plurality of paths existing as a routing path of the packet changes, receives multipath MTU information including path MTU information of each of the plurality of paths and further including scheduled time information on availability/non-availability of each of the plurality of paths from the network relay apparatus or the data receiving apparatus; and
- a packet length control section that selects, based on the multipath MTU information received by the multipath MTU information reception section, path MTU information from among the path MTU information of each of the plurality of paths which corresponds to a desired routing path, and determines the packet length of the packet based on the selected path MTU information, and wherein the network relay apparatus or the data receiving apparatus comprises:
- a path MTU search section that, when the plurality of paths exist as the routing path of the packet, searches the path MTU information of each of the plurality of paths;
- a multipath MTU information creation section that creates the multipath MTU information including the path MTU information of each of the plurality of paths searched by the path MTU search section and further including the scheduled time information on the availability/non-availability of each of the plurality of paths; and
- a multipath MTU information notification section that transmits the multipath MTU information to the sender of the packet when the situation of the plurality of paths changes.

\* \* \* \* \*

UNITED STATES PATENT AND TRADEMARK OFFICE
CERTIFICATE OF CORRECTION

| | |
|---|---|
| PATENT NO. | : 8,107,498 B2 |
| APPLICATION NO. | : 12/294014 |
| DATED | : January 31, 2012 |
| INVENTOR(S) | : Tetsuro Morimoto et al. |

It is certified that error appears in the above-identified patent and that said Letters Patent is hereby corrected as shown below:

Claim 8, column 21, line 46, incorrectly reads:

"apparatus, the multipath. MTU information to the sender"

and should read:

"apparatus, the multipath MTU information to the sender"

Claim 9, column 22, line 15, incorrectly reads:

"9. A multipath MTU finding system n which, in a packet"

and should read:

"9. A multipath MTU finding system in which, in a packet"

Signed and Sealed this
Twenty-second Day of May, 2012

David J. Kappos
*Director of the United States Patent and Trademark Office*